United States Patent [19]

Gunell

[11] Patent Number: 5,634,822

[45] Date of Patent: Jun. 3, 1997

[54] MINIATURE TELEPHONE JACK AND RACK SYSTEM

[75] Inventor: Gary J. Gunell, Woodinville, Wash.

[73] Assignee: Augat Inc., Mansfield, Mass.

[21] Appl. No.: 339,338

[22] Filed: Nov. 14, 1994

[51] Int. Cl.⁶ ................................................. H01R 17/18
[52] U.S. Cl. ................................. 439/668; 439/668
[58] Field of Search ................................ 439/668, 669, 439/676, 638, 540, 709

[56] References Cited

U.S. PATENT DOCUMENTS

| | | | |
|---|---|---|---|
| 3,524,198 | 8/1970 | Malmstadt et al. | |
| 3,852,703 | 12/1974 | Carney et al. | 339/198 |
| 4,134,631 | 1/1979 | Conrad et al. | 339/17 |
| 4,160,880 | 7/1979 | Brey | 179/98 |
| 4,204,095 | 5/1980 | De Luca et al. | 179/98 |
| 4,548,447 | 10/1985 | Dinsmore | 339/14 |
| 4,548,453 | 10/1985 | Mummey et al. | 339/17 |
| 4,737,113 | 4/1988 | Hopper et al. | 439/78 |
| 4,770,639 | 9/1988 | Lau | 439/61 |
| 4,797,114 | 1/1989 | Lau | 439/79 |
| 4,820,200 | 4/1989 | Lau | 439/607 |
| 4,840,568 | 6/1989 | Burroughs et al. | 439/49 |
| 4,954,096 | 9/1990 | Frank | 439/346 |
| 5,145,416 | 9/1992 | Cruise et al. | 439/668 |

OTHER PUBLICATIONS

"Telzon Digital Signal Cross/Connect (DSX) T1–T1C", Augat Telzon Technical Practice, Oct. 1992.
"Rear Cross Connect DSX", Augat Communications Group, Inc., Telzon, 1988.

Primary Examiner—David L. Pirlot
Attorney, Agent, or Firm—Weingarten, Schurgin, Gagnebin & Hayes LLP

[57] ABSTRACT

A miniature telephone jack rack system is disclosed. When located within the rack, adjacent miniature telephone jacks are offset vertically so as to permit a standard plug to be inserted into each miniature jack without physically interfering with the insertion of plugs into either of the adjacent miniature jacks. Interference between adjacent plugs is avoided while minimum spacing between adjacent plugs is maintained.

14 Claims, 18 Drawing Sheets

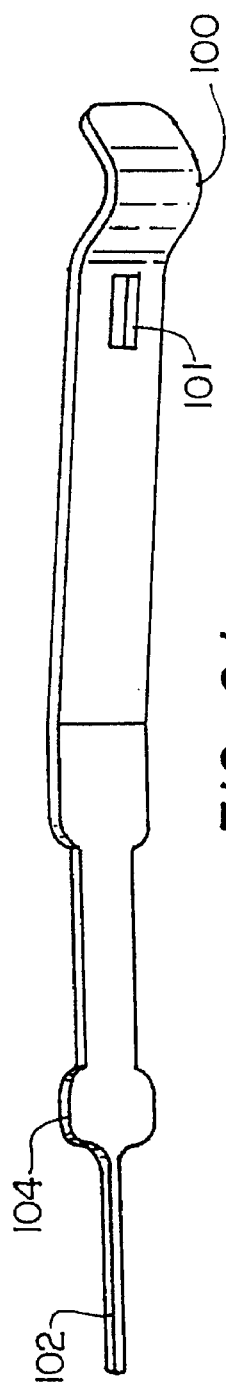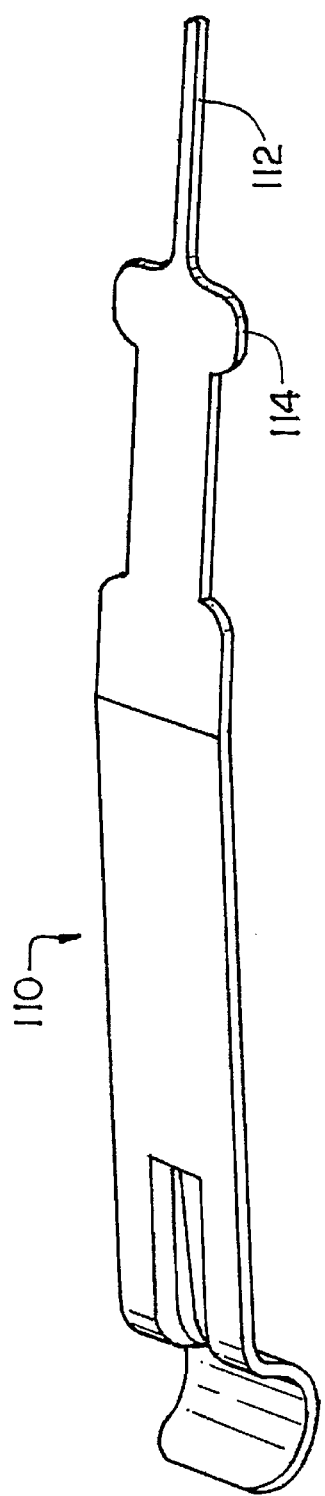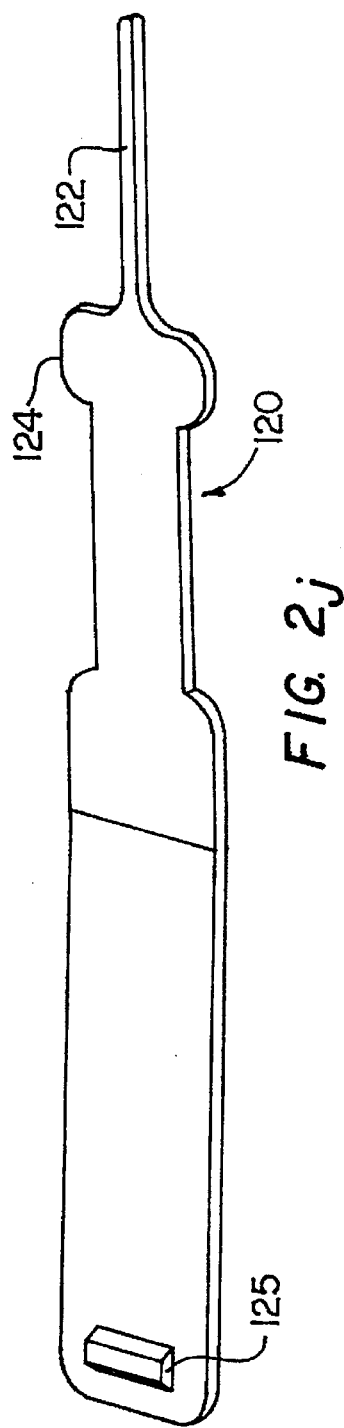

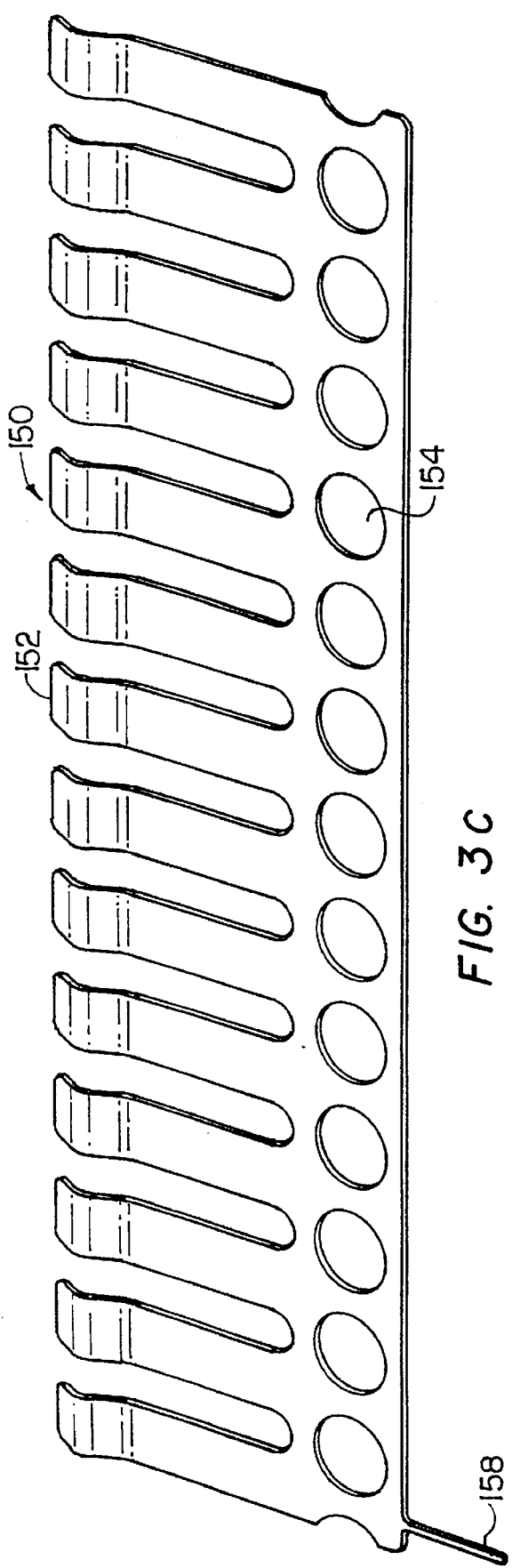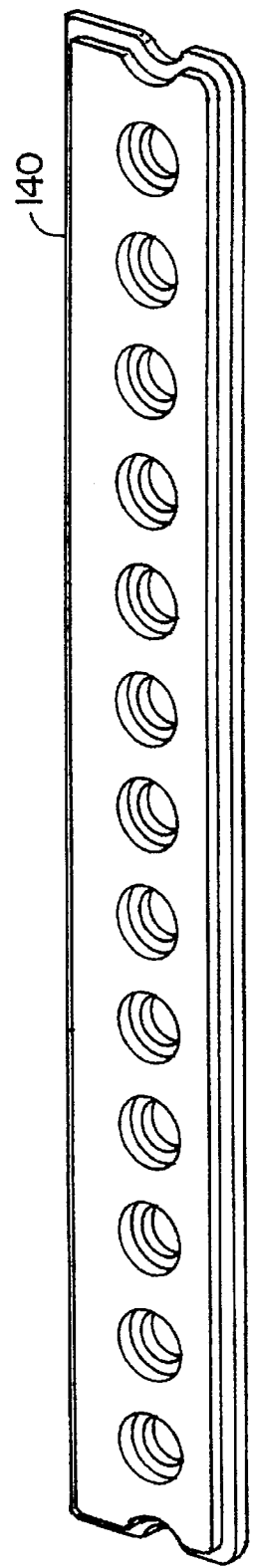

MINIATURE TELEPHONE JACK AND RACK SYSTEM

FIELD OF THE INVENTION

The invention relates to telephone jacks and racks for the telephone jacks and more specifically to miniature telephone jacks and racks used in telephone switching bays.

BACKGROUND OF THE INVENTION

In general, a telephone jack includes an housing having at least one port which provides access, by an insertable plug, to a series of electrical spring contacts within the jack. In the absence of the insertable plug, various ones of the spring contacts are in electrical communication with various others of the spring contacts to thereby provide electrical continuity between the spring contacts. When the insertable plug is inserted through the port, various contacts which were previously in electrical communication with each other are separated, thereby interrupting the electrical continuity between those contacts. In addition to interrupting the electrical continuity between certain of the spring contacts within the telephone jack, the insertable plug also causes other various spring contacts which had not previously been in contact to come into contact to thereby establish electrical continuity between those various spring contacts. Additionally, the insertion of the insertable plug causes electrical continuity to be established between some of the various spring contacts and the internal conductors of the insertable plug. In this manner, signals may pass between certain contacts when the insertable plug is not present within the telephone jack and may pass to the conductors of the insertable plug when the insertable plug is inserted.

To provide these various make/break connections, telephone jacks typically include an isolator spring which deflects in the presence of an insertable plug and thereby forces one contact against another contact, establishing electrical continuity. Additionally, the isolator spring may be biased, in the absence of the insertable plug, to force other spring contacts together. Such isolator springs are typically constructed of a resilient insulating plastic material which is heat staked or frictionally fit into the jack housing. Thus the isolator spring is attached to the housing along with the contacts when the jack is assembled.

Typically, many telephone jacks, such as those just discussed, are located side by side in telephone jack racks. Numerous racks are in turn located in switching bays. Since each telephone line is associated with at least one jack, large numbers of the jacks must be located in close proximity to one another at telephone switching locations. Thus it desirable to make the jacks as small as possible, in order to increase the density of the jacks in each switching bay. Such small jacks are typically referred to as bantam jacks.

However, as the size of the jacks become smaller, a plug which is inserted into one jack may physically interfere with a plug that is inserted into an adjacent jack. One solution to this problem is to use plugs with smaller physical dimensions. However, in such an instance, since not all switching bays in a switching facility will have miniature jacks, several sizes of plugs would have to be maintained. This leads to increased costs and logistical problems.

The present invention relates to a miniature jack and rack that provides for an increased jack density while permitting standard plugs to be used.

SUMMARY OF THE INVENTION

The invention relates to a miniature telephone jack and a rack system for a miniature telephone jack. When located within the rack, adjacent miniature telephone jacks are offset vertically so as to permit a standard plug to be inserted into each miniature jack without physically interfering with the insertion of a plug into either of the adjacent miniature jacks. Thus, interference between adjacent plugs is avoided while minimum spacing between adjacent plugs is maintained. The jacks are preferably of modular construction for insertion and removal from an associated rack module.

In one embodiment, a standard 23 inch rack is capable of holding six modules. Each module, in turn, holds 14 miniature jacks in a vertically staggered array. Thus, each rack holds a total of 84 miniature jacks. Each adjacent jack is vertically offset from the preceding jack and is retained in the rack module by a jack retainer. In another embodiment, the rack module includes a plurality of LEDs located in an LED assembly positioned above the miniature jacks. Each of the LEDs acts as a visual indicator for its respective miniature telephone jack in the rack. The jacks can alternatively be disposed in vertically offset position across the width of an associated rack without the use of modules.

In one embodiment, the miniature telephone jack includes a housing, defining at least one cavity. A plurality of spring contacts is positioned within the cavity. Each telephone jack is electrically isolated from its adjacent telephone jacks by at least one shield. Certain spring contacts are isolated from certain other spring contacts by at least one integrally formed resilient isolator spring. In one embodiment, leads of the spring contacts extend from the rear of the housing in a single linear array.

DESCRIPTION OF THE DRAWINGS

This invention is pointed out with particularity in the appended claims. The above and further advantages of this invention may be better understood by referring to the following description taken in conjunction with the accompanying drawing, in which:

FIG. 21 is a cross-sectional view through 1—1' of FIG. 2 showing plugs inserted into the jack and the effect the insertion has on the spring contacts of the jack;

FIG. 3b is a bottom perspective view of an embodiment of the LED cover of the LED housing shown in FIG. 1;

FIG. 3c is a perspective view of the ground contact springs for the LED housing shown in FIG. 3;

FIGS. 4b and 4c are a back and a front perspective view, respectively, of an embodiment of a jack retainer for the embodiment of the rack module spacer element shown in FIGS. 4 and 4a;

DETAILED DESCRIPTION OF THE INVENTION

Figure 1:
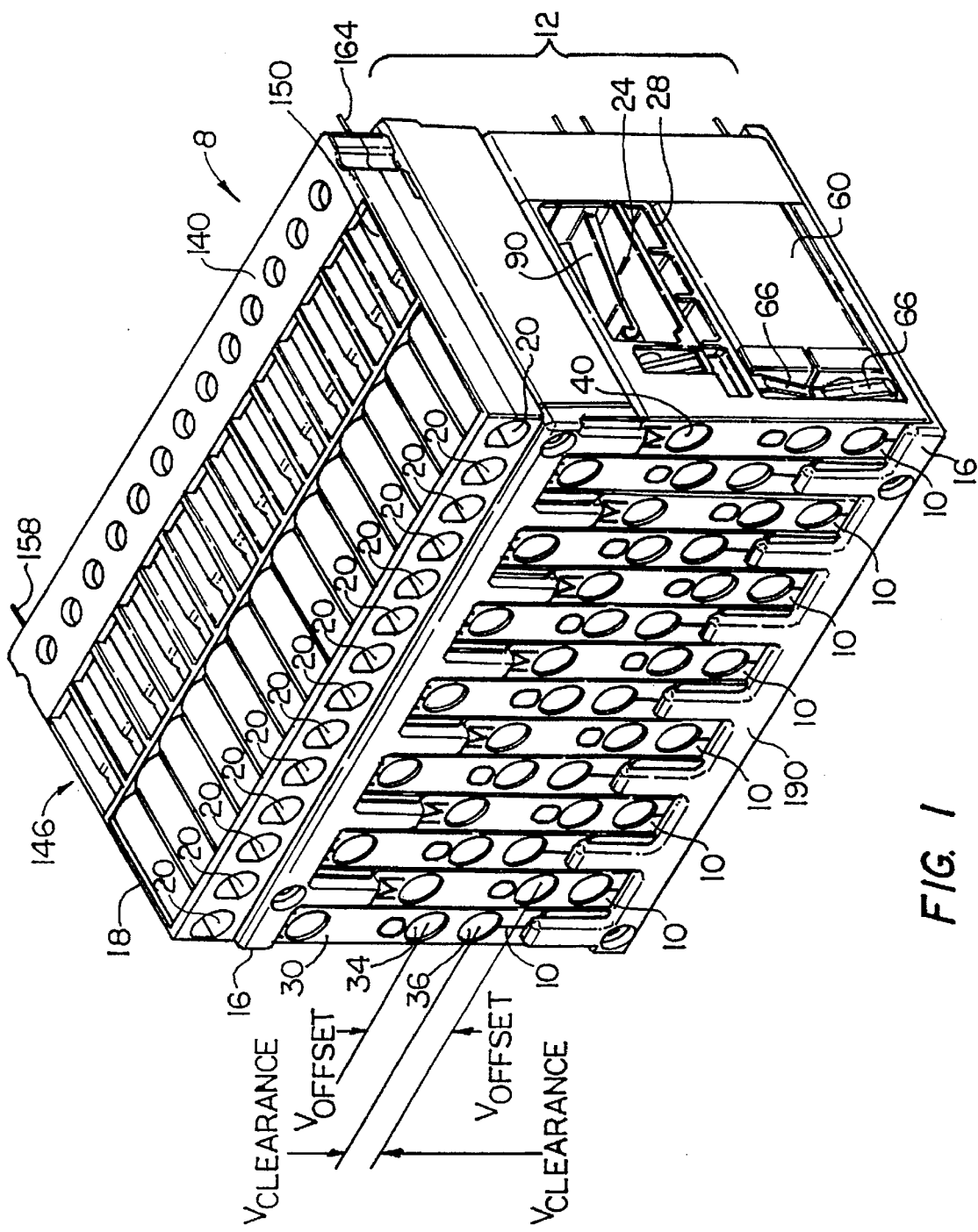
FIG. 1 a perspective drawing of an embodiment of the rack and the installed miniature telephone jacks of the invention.

Referring to FIG. 1, one embodiment of a miniature telephone jack and rack system 8 includes a plurality of miniature telephone jacks 10 and a rack module 12. Each miniature telephone jack 10 is positioned between a pair of jack guides 14 (FIGS. 4, 4a) which vertically offset the ports 34, of adjacent miniature jacks 10 by a predetermined amount $V_{offset}$. In one embodiment (FIGS. 1 and 2d), the value of $V_{offset}$ measured from the centers varies from 0.468 inches minimum to 0.500 inches nominal. With this offset, $V_{offset}$, a spacing, $V_{clearance}$, is provided between the ports 34, 36 of adjacent miniature jacks 10 of 0.372 inches nominal as measured from the center of the ports. Two jack retainers 16, one located on each jack guide 14 at the top and bottom of the rack module 12, retain the miniature jacks 10 between the jack guides 14. In one embodiment, an LED housing 18 is positioned above the upper jack guide 14 and retains a plurality of LEDs (not shown) each within a respective cavity 20 in a linear array. In another embodiment the cavities which hold the plurality of LEDs are vertically offset or staggered with respect to one another in a fashion similar to that shown for the jacks. Each cavity 20 of the LED housing 18 corresponds to a respective miniature jack 10 in the rack module 12. In one embodiment, a standard telephone rack is capable of holding six rack modules 12, each holding fourteen miniature jacks 10, at a standard 0.312 inch spacing for a total of 84 miniature jacks per rack, thereby permitting the use of standard bantam single or double plugs or patch cords.

The invention does not require the use of modules 12. The jack can also be retained in a suitably configured rack enclosure wherein the entire array of jacks can span the width of the rack. The modules 12 are useful in providing clusters of jacks which are installable into a rack. Moreover, repair and replacement is facilitated by the use of the removable modules, as well as the removable jacks.

Figure 2:
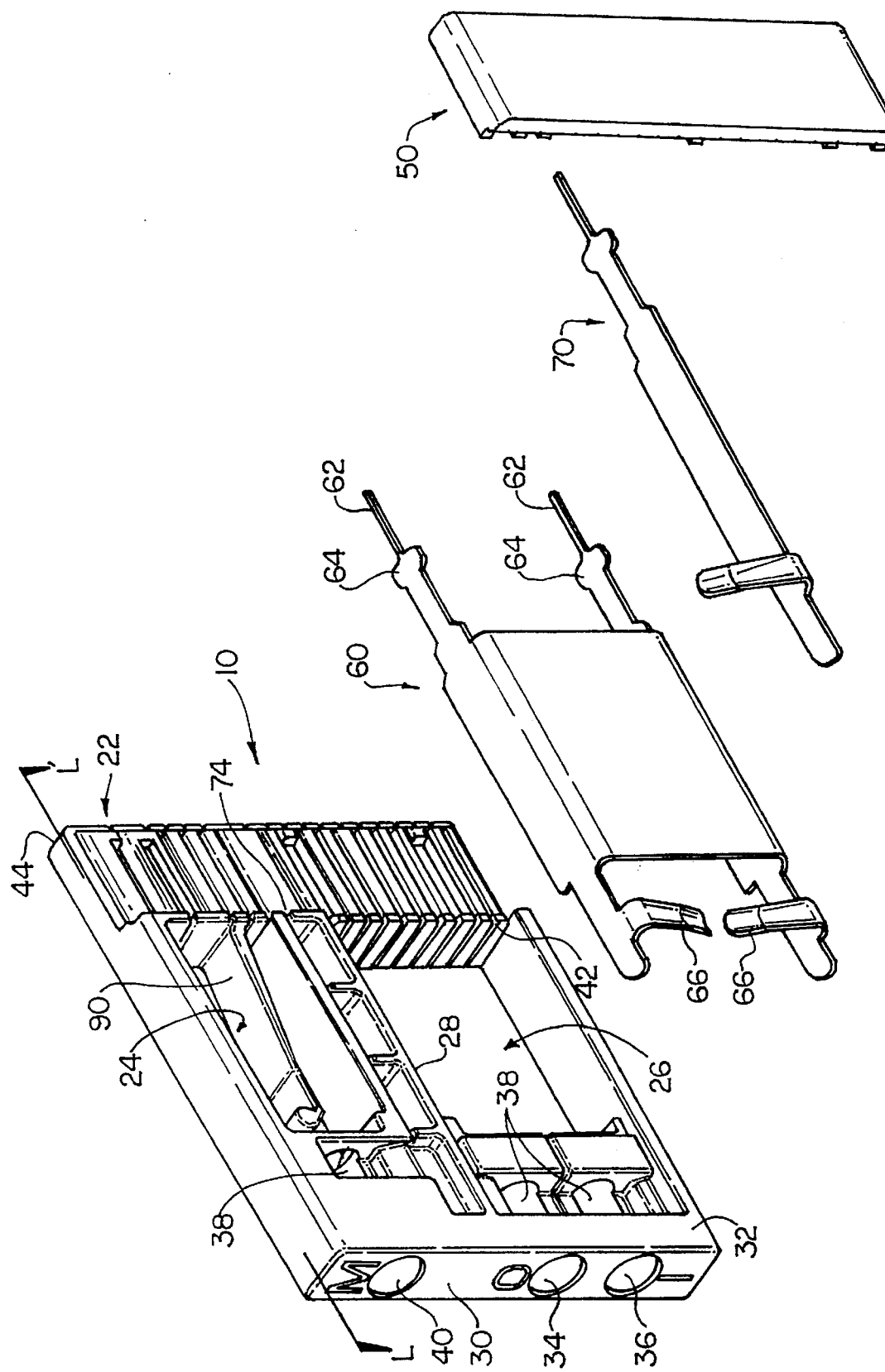
FIG. 2 is an exploded view of the embodiment of the miniature telephone jack of FIG. 1 without its spring contacts.
Figure 2A:
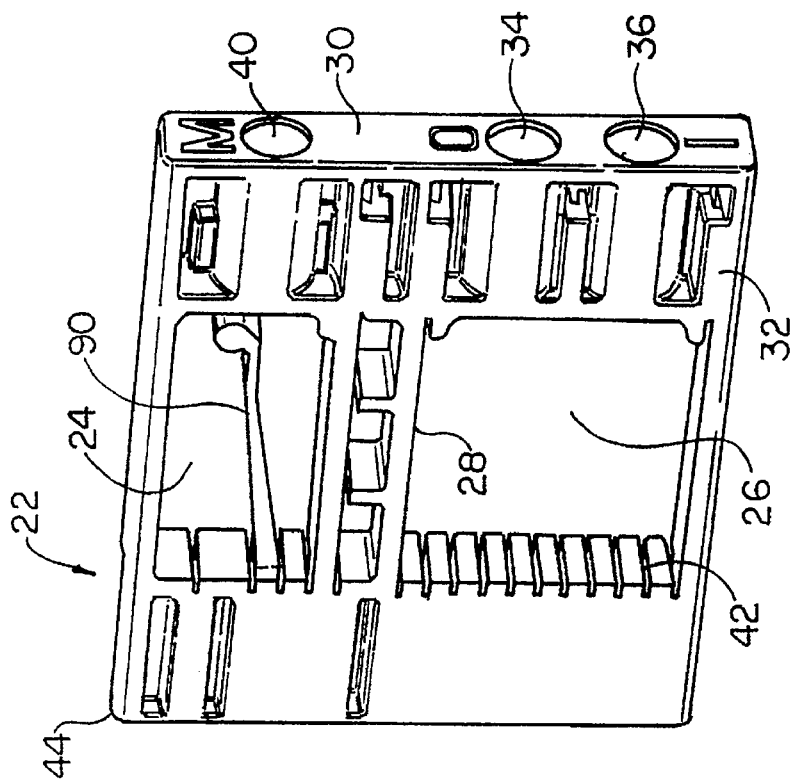
FIGS. 2a and 2b are a left and a right perspective view, respectively, of the embodiment of the miniature telephone jack of FIG. 2.
Figure 2B:
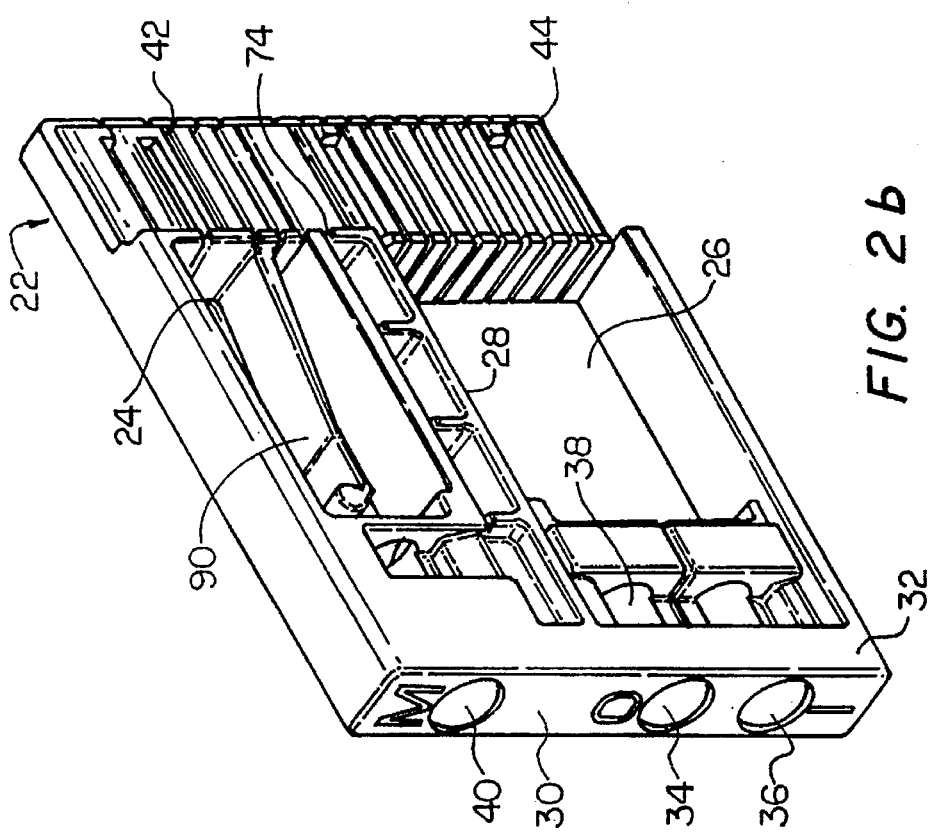
Figures 2C, 2D:
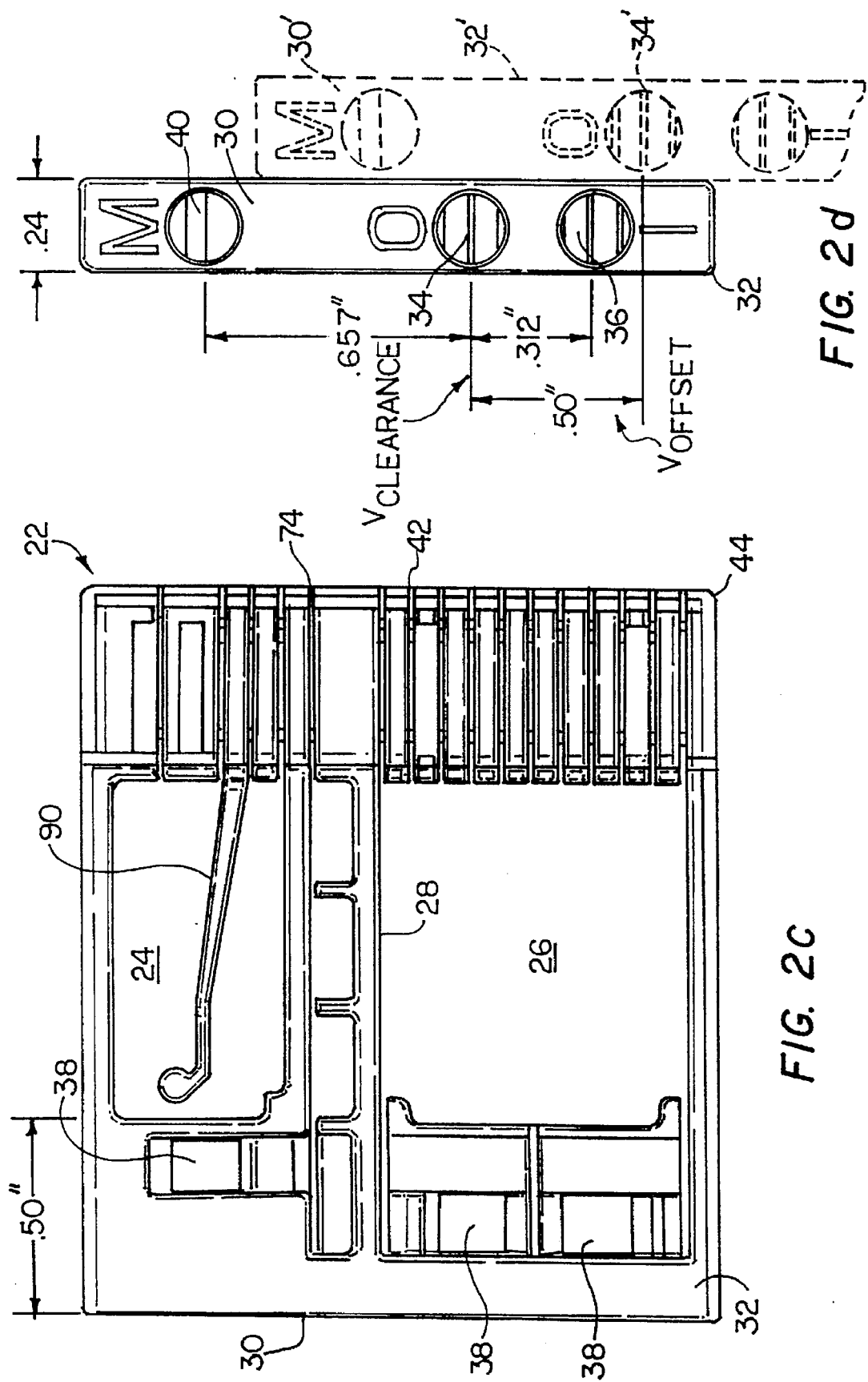
FIGS. 2c and 2d, are, respectively, a right plan view and a front view (with an adjacent miniature telephone jack shown in phantom) of the embodiment of the miniature telephone jack of FIG. 2.

Considering each component of the miniature jack and rack system 8 individually and referring to FIGS. 2-2d, one embodiment of a miniature jack 10 includes a housing 22, made of a plastic, such as ABS polycarbonate. In one embodiment, the housing 22 defines a first cavity 24 and a second cavity 26. The cavities 24 and 26 are separated from one another by a wall 28, which is a structural member that maintains the proper alignment of the inserted plug and electrical contacts of the jack. The front face 30 of the front wall 32 of the housing 22 includes two jack ports 34, 36, typically denoted output, O, and input, I, respectively, which extend from the front face 30 of the housing 22 through semi-cylindrical guides 38 into the cavity 26. Another jack port 40, typically denoted monitor, M, extends from the front face 30 of the housing 22 through a semi-cylindrical guide 38 into cavity 24. Each semi-cylindrical guide 38 is sufficiently long so as to provide the proper alignment of a plug with respect to contacts positioned within the cavities 24, 26 adjacent the ports. In one embodiment each semi-circular guide 38 is 0.500 inches in length.

A plurality of slots 42 (only one numbered for clarity) extend from the cavities 24, 26 through the back wall 44 of the housing 22. Each of a plurality of spring contacts (not shown) is held in a respective slot 42 and extends through the back wall 44 of the housing 22 from the cavities 24, 26. Each spring contact is retained in its respective slot 42 by a spring contact retainer 50. When positioned within the rack module 12, the leads of each spring contact of each miniature jack 10 extend from the rear of the rack module 12. In one embodiment the leads are gold plated and removably plug into gold plated retainer holes in a backplane.

Figure 2E:
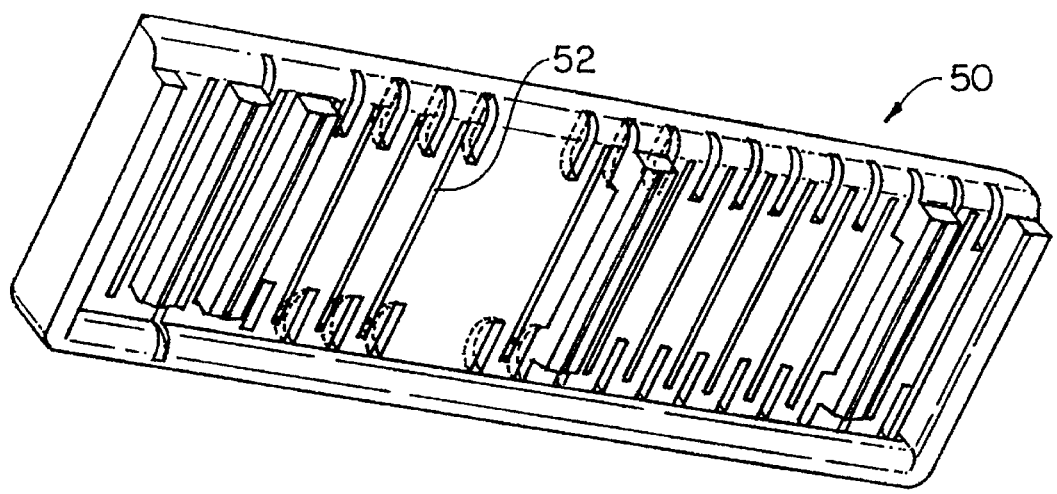
FIG. 2e is a bottom perspective view of an embodiment of the spring contact retainer of the embodiment of the miniature telephone jack of FIG. 2.

FIG. 2e depicts a bottom perspective view of an embodiment of the spring contact retainer 50 which includes a plurality of slots 52 (only one labeled for clarity) that correspond to and align with the slots 42 in housing 22. When the spring contact retainer 50 is attached adjacent the back wall 44 of the housing 22, the slots 52 of the spring contact retainer 50 coact with slots 42 of the housing 22 to retain the spring contacts within the slots 42 of the housing 22. In one embodiment, the retainer 50 includes energy directors that melt and attach the retainer 50 to the housing 22 when ultrasonically welded.

Figure 2F:
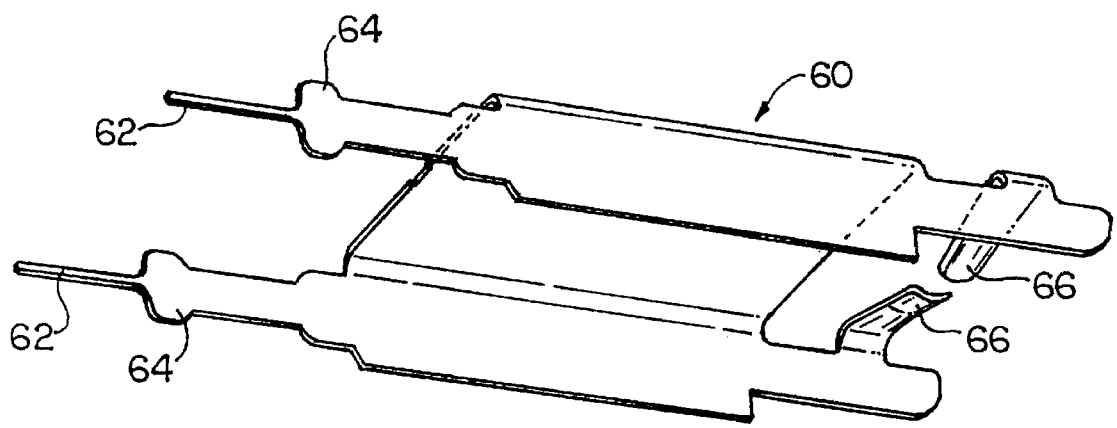
FIG. 2f is a bottom side perspective view of the embodiment of the body shield shown in FIG. 2.

A shield member 60 is positioned over one side of the cavity 26 to prevent signal cross-talk between adjacent jacks and to provide a ground contact to the shield ground portion of a plug inserted in the jack ports 34, 36. The shield member 60 (FIG. 2f) includes two terminals 62 for providing electrical continuity with the electrical ground of the backplane. Adjacent each terminal 62 is a mounting portion 64 which resides in a slot 42 in the housing 22 and a slot in the spring contact retainer 50. The shape of the mounting portion 64 retains the shield 60 in the slots 42 of the housing 22 which are configured to accept the mounting portion 64. Two tabs 66 extend over the open portions of the semi-cylindrical guides 38 and make contact with the shield ground area of a plug entering the semi-cylindrical guides 38.

Figure 2G:
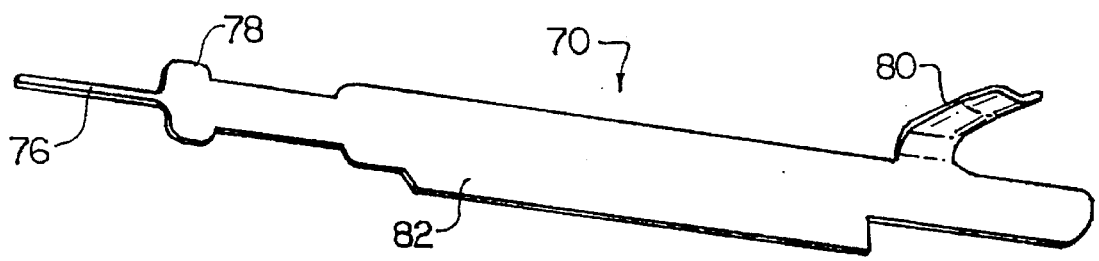
FIG. 2g is a bottom perspective view of the embodiment of the dividing shield shown in FIG. 2.

A second spring 70 (FIG. 2g) is positioned in a slot 74 adjacent wall 28 between the cavities 24, 26. As with the shield member 60, the second spring 70 includes a terminal 76 for providing electrical contact with a backplane. The second spring 70 also includes a mounting portion 78 which engages the slot 42 in the housing 22 and a slot in the spring contact retainer 50 and which retains the second spring 70 in the housing 22 as described previously. A tab 80, extending at an angle from the second shield body 82 provides a connection to the shield ground of a plug entering the semi-cylindrical guide 40 and thereby connects the plug shield ground to the shield ground of the telephone bus system.

Positioned within cavity 24 is a resilient isolator 90 which is integrally formed with the back wall 44 of the housing 22. The resilient isolator 90 flexes upon the insertion of a plug into the jack port 40 thereby causing certain spring contacts (FIG. 2l) to flex toward and contact other spring contacts to thereby make a complete electrical path and causing other spring contacts to flex away from one another to thereby break an electrical path.

Considering the various spring contacts individually, FIG. 2h depicts a bottom perspective view of a Tip-spring contact 100 with wiping contact 101. A Tip-spring contact 100 includes a terminal 102 which makes contact with and plugs into a backplane connection to thereby provide electrical continuity between the remainder of the Tip-spring contact 100 and the backplane connection. The Tip-spring contact 100 also includes a mounting portion 104 which, as described with respect to the shield member 60 and second spring 70, engages a slot 42 in the housing 22 and a slot 52 in the spring contact retainer 50. Again, the shape of the mounting portion 104 retains the Tip-spring contact 100 in the housing 22. The wiping contact 101 of the Tip-spring contact 100 interacts with the wiping contact 125 of the wiping contact spring 120 (FIG. 2j) to remove oxide from the wiping contact region of the 2 spring contacts. Although this Tip-spring contact 100 is shown with the wiping contact 101, other embodiments of the Tip-spring contacts 100' (FIG. 2l) do not have the wiping contact 101.

Similarly, FIG. 2i depicts a top perspective view of one embodiment of a Ring-spring contact 110. The ring spring contact 110 includes a terminal 112 which makes contact with and plugs into a backplane as described previously with respect to the Tip-spring 100. The ring spring contact 110 also includes a mounting portion 114 but in this embodiment does not include a wiping contact. The Ring-spring is used to conduct the ring DS1 digital signal.

Figure 2K:
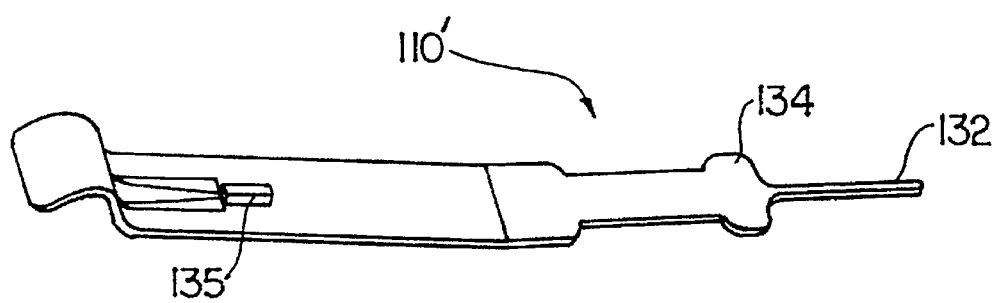
FIG. 2k is a bottom perspective view of an embodiment of the Ring-spring contact, with wiping contact, of the invention.

FIG. 2k depicts a top perspective view of a wiping spring contact 120, which makes and breaks contact with the Tip and Ring-springs 100, 110, respectively. Again, as with the Tip-spring contacts 100, a wiping spring contact 120 includes a terminal 122, a mounting portion 124, and a wiping contact 125 which contacts with the wiping contacts on the other springs to remove oxide from the spring contacts.

Finally FIG. 2k depicts a bottom perspective view of an Ring-spring contact 110' with wiping contact 135. The Ring-spring 110' also has a terminal 132 and a mounting portion 134.

Figure 2L:
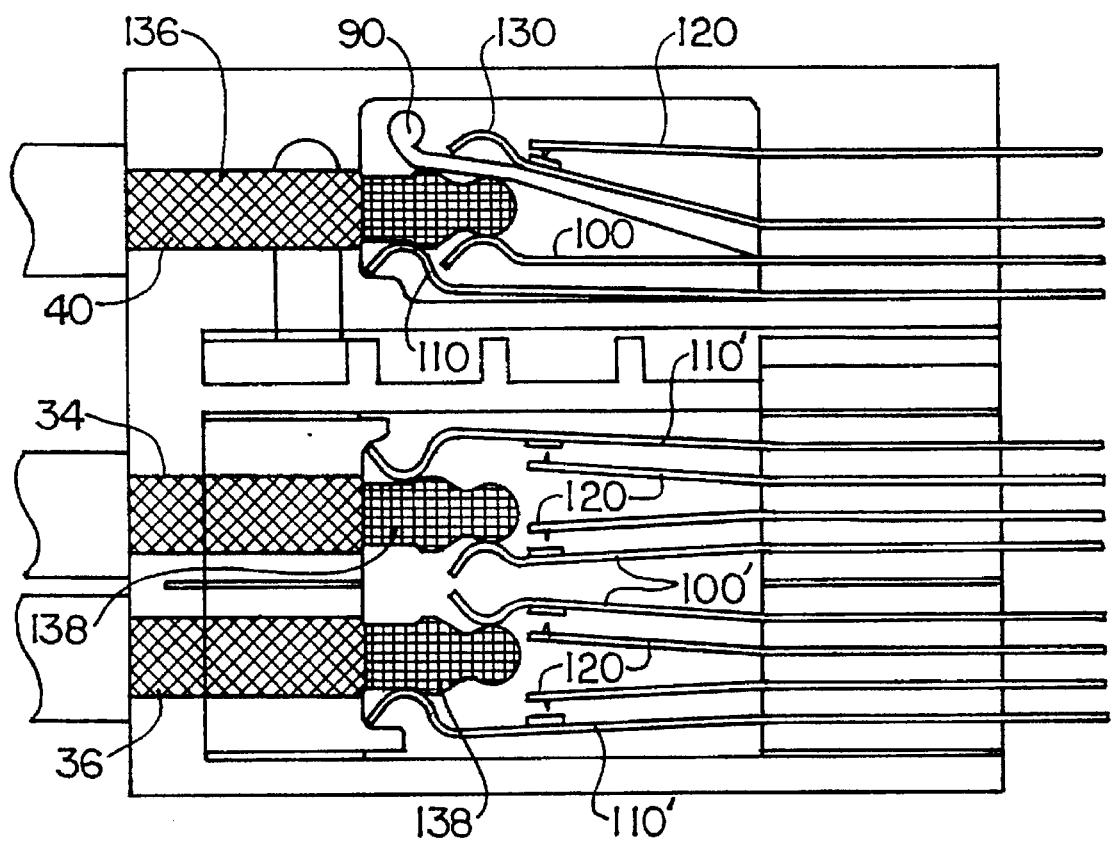
FIG. 2h is a bottom perspective view of the Tip-spring contact, with wiping contact, of the invention.
FIG. 2i is a top perspective view of an embodiment of the Ring-spring contact of the invention.
FIG. 2j is a top perspective view of an embodiment of the wiping spring contact of the invention.

FIG. 2l depicts a cross-sectional view of the jack of FIG. 2 with the spring contacts in position and plugs inserted in the semi-circular guides. Plug 136 causes resilient member 90 to deflect causing two spring contacts 130, 120 to touch. Conversely plugs 138 cause Tip-spring 100 and Ring-spring 110, which are normally in contact with wiping springs 120', to separate and make electrical contact with the tip and ring portions of the plugs 138, respectively.

Figure 3:
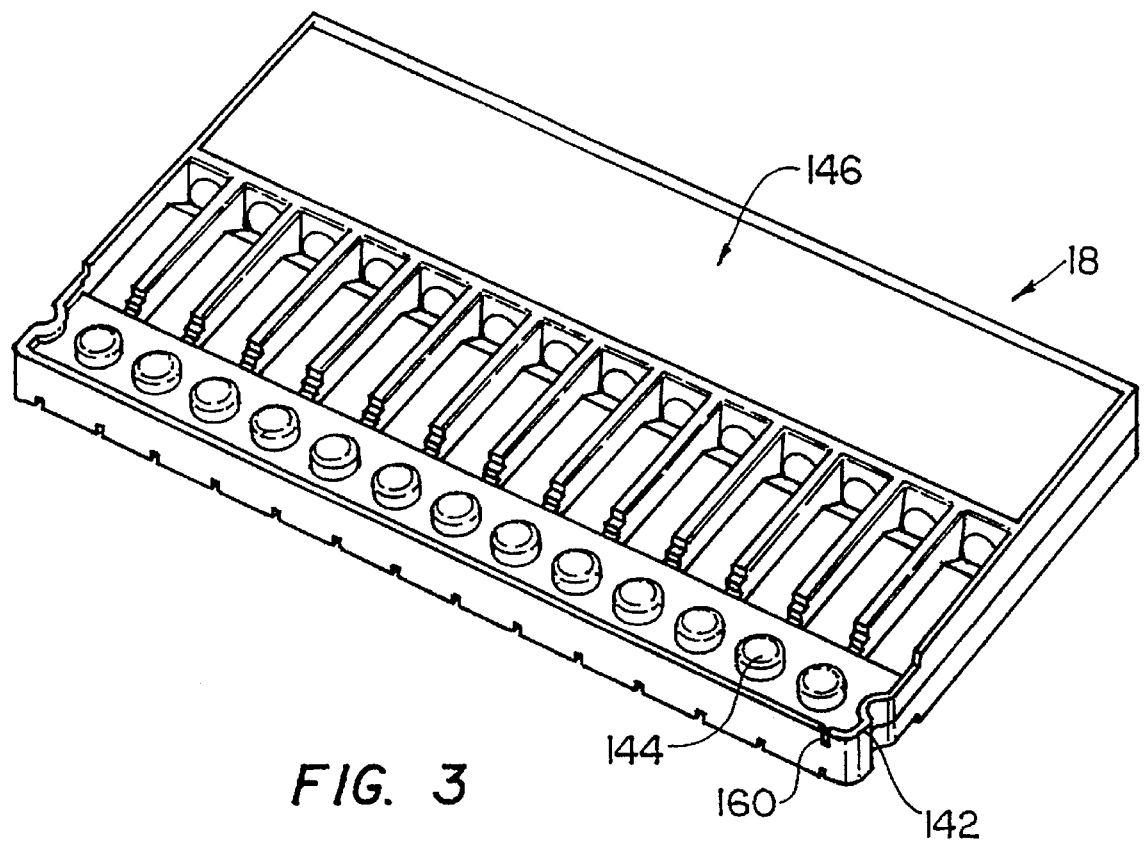
FIGS. 3 and 3a, are, respectively, a top and bottom perspective view of the embodiment of the LED housing of FIG. 1.
Figure 3A:
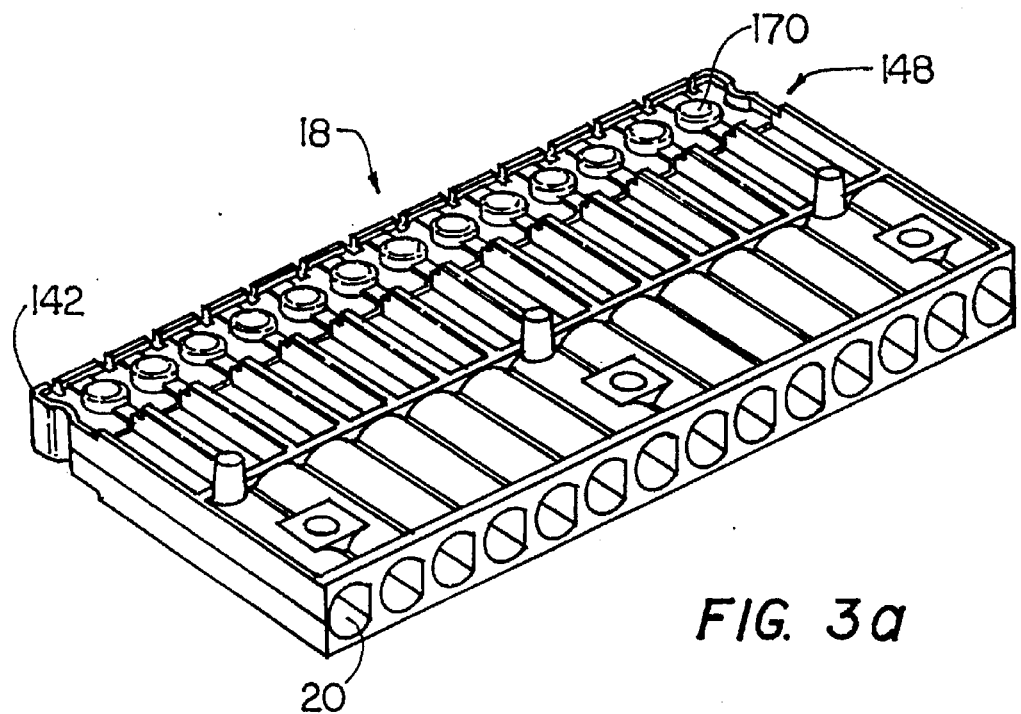

Referring also to FIGS. 3 and 3a, the LED housing 18 defines a plurality of ports 20 in which LEDs are positioned. A retainer 140, FIG. 3b is positioned along the top and bottom rear edges 142 of the LED housing 18 and is secured there by ultrasonic welding. Positioned adjacent one surface 146 of housing 18, is a grounding contact 150, shown in perspective view in FIG. 3c. The grounding contact 150 includes a plurality of springs 152 (only one numbered for clarity) each of which provides one electrical ground connection to a respective one of the LEDs in LED housing 18. The grounding contact 150 a plurality of holes 154 which engage posts 144 in the housing 18 and is retained on the posts 144 by retainer 140. The grounding contact 150 also includes a terminal 158 which provides the ground connection to the backplane and which exits the housing 18 through a slot 160.

Figure 3D:
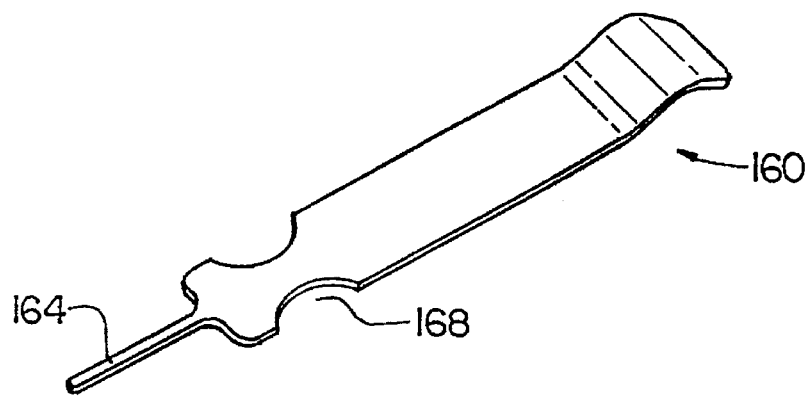
FIG. 3d is a perspective view of the LED receptacle spring for the LED housing shown in FIG. 3.

Positioned adjacent the other surface 148 of the housing 18, are a plurality of individual power springs 160, shown in perspective view in FIG. 3d. Each power spring 160 provides power to its respective LED. As with the other springs, each power spring 160 includes a terminal 164 for obtaining power from a backplane. Each power spring 160 includes a cutout 168 which locates the spring between the posts 170 in the housing 18.

Figure 4:
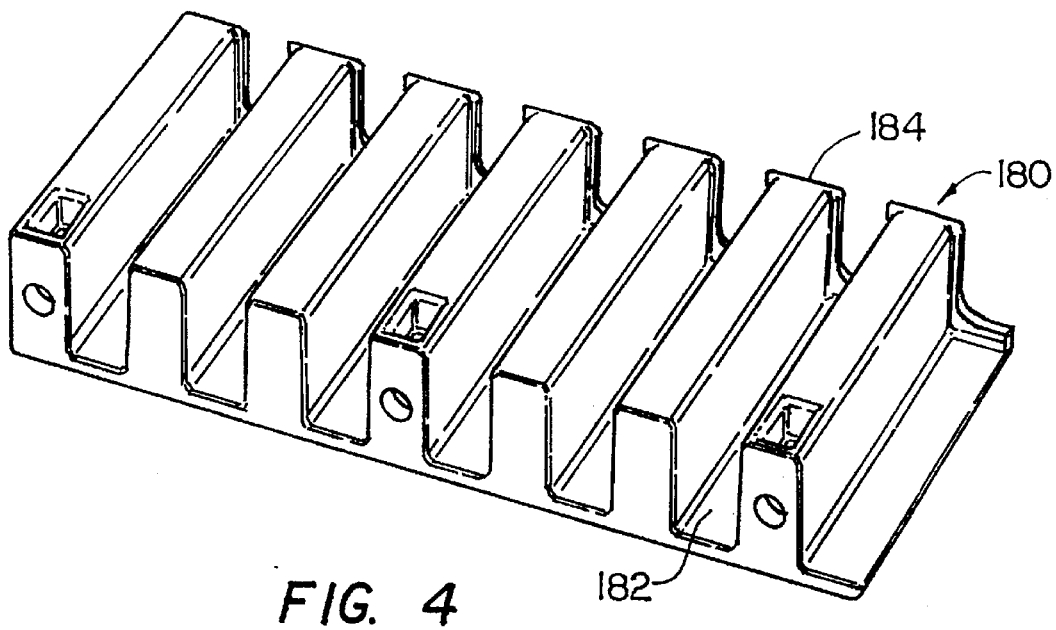
FIGS. 4 and 4a are top and bottom perspective drawings of the embodiment of the rack module spacer element shown in FIG. 1.
Figure 4A:
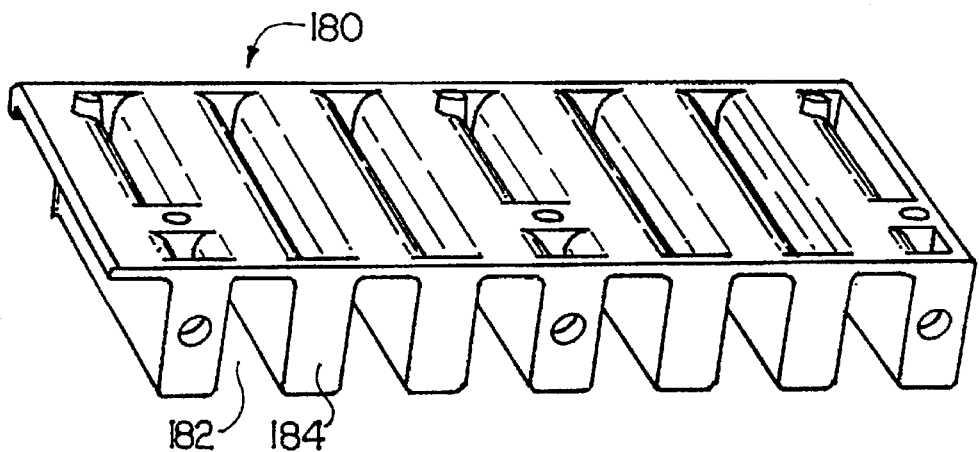

FIGS. 4 and 4a are a top and bottom perspective view, respectively, of a jack guide 180, used to vertically offset each miniature jack 10 positioned on it with respect to its adjacent miniature jack 10. The jack guide 180 includes a plurality of troughs 182 and a plurality of pedestals 184, within which and upon which, respectively, the miniature jacks 10 reside. The top and bottom jack guides 180 are identical except that when positioned to hold the miniature jacks 10, the trough 182 of one guide 180 is opposite the pedestal 184 of the other jack guide 180. Thus alternating miniature jacks 10 are located within the troughs 182 and alternating miniature jacks 10 are located on the pedestals 184, thereby vertically staggering the adjacent miniature jacks 10. The distance $V_{offset}$ between the top of the pedestal 184 and the bottom of the trough 182 is such that adjacent jacks positioned on the jack guide are vertically separated sufficiently to permit plugs to be inserted into adjacent jacks without interference.

Figure 4B:
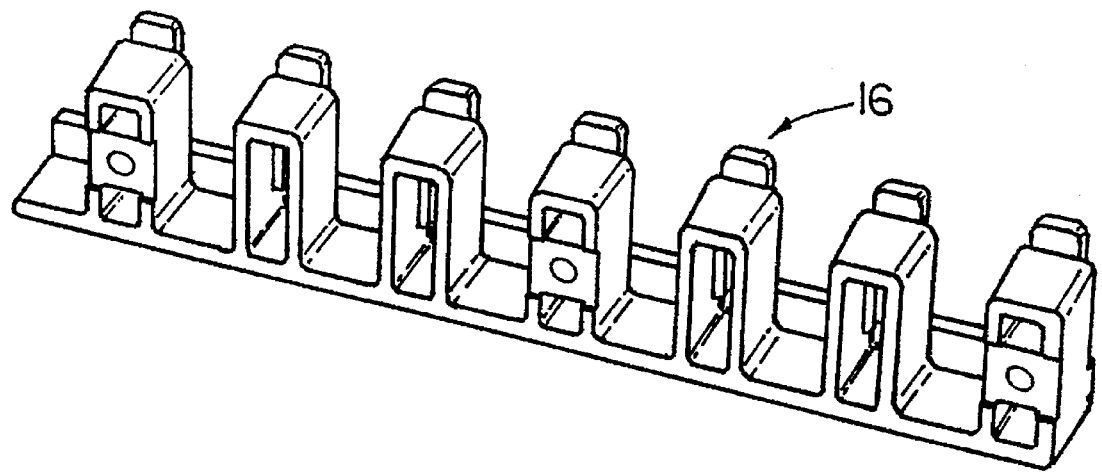
Figure 4C:
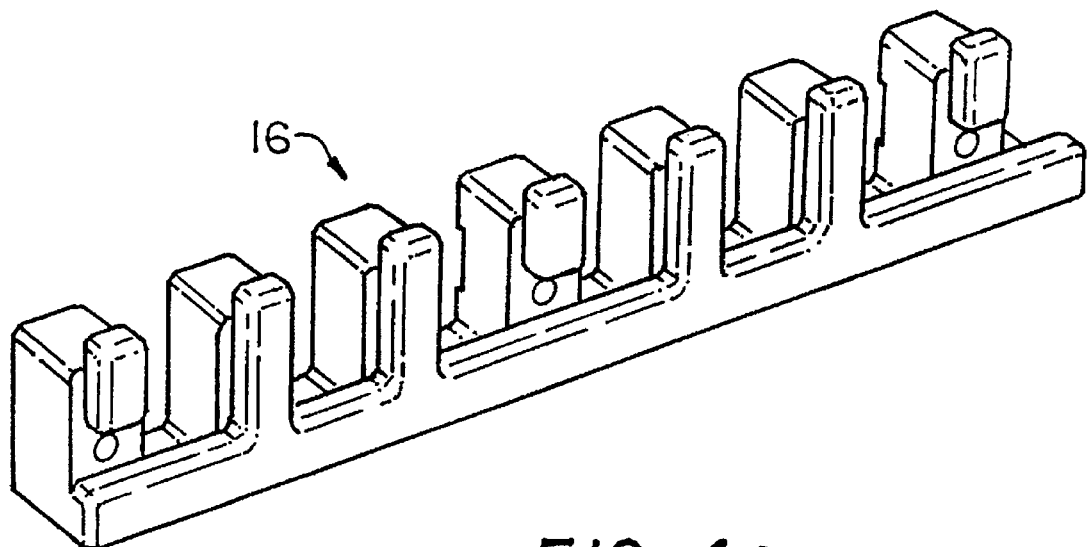

Once the miniature jacks 10 are positioned by the jack guides 180, a pair of jack retainers 16, shown in back and front perspective views in FIGS. 4b and 4c respectively, retains the miniature jacks 10 within the jack guides 180. In one embodiment, each jack retainer is held to the jack guides 180 with screws.

Figure 5:
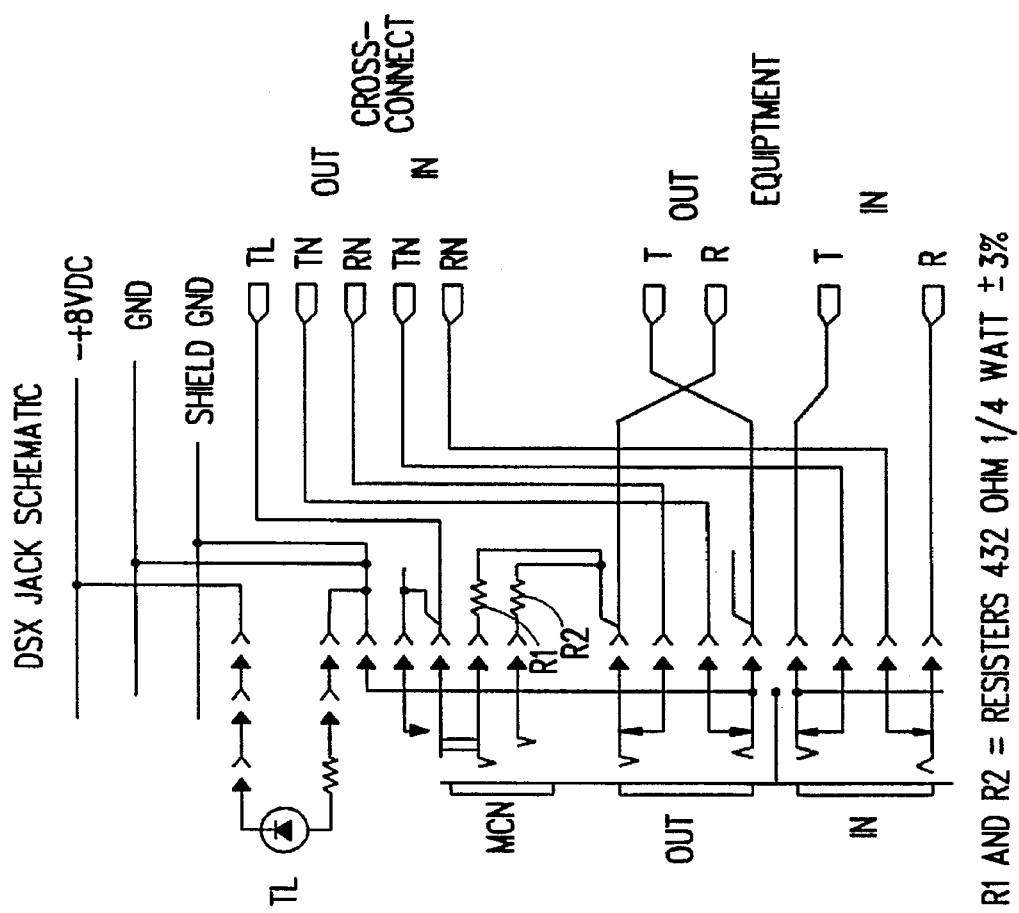
FIG. 5 is a schematic diagram of a circuit in which the miniature telephone jack of the invention maybe used.
Figure 6:
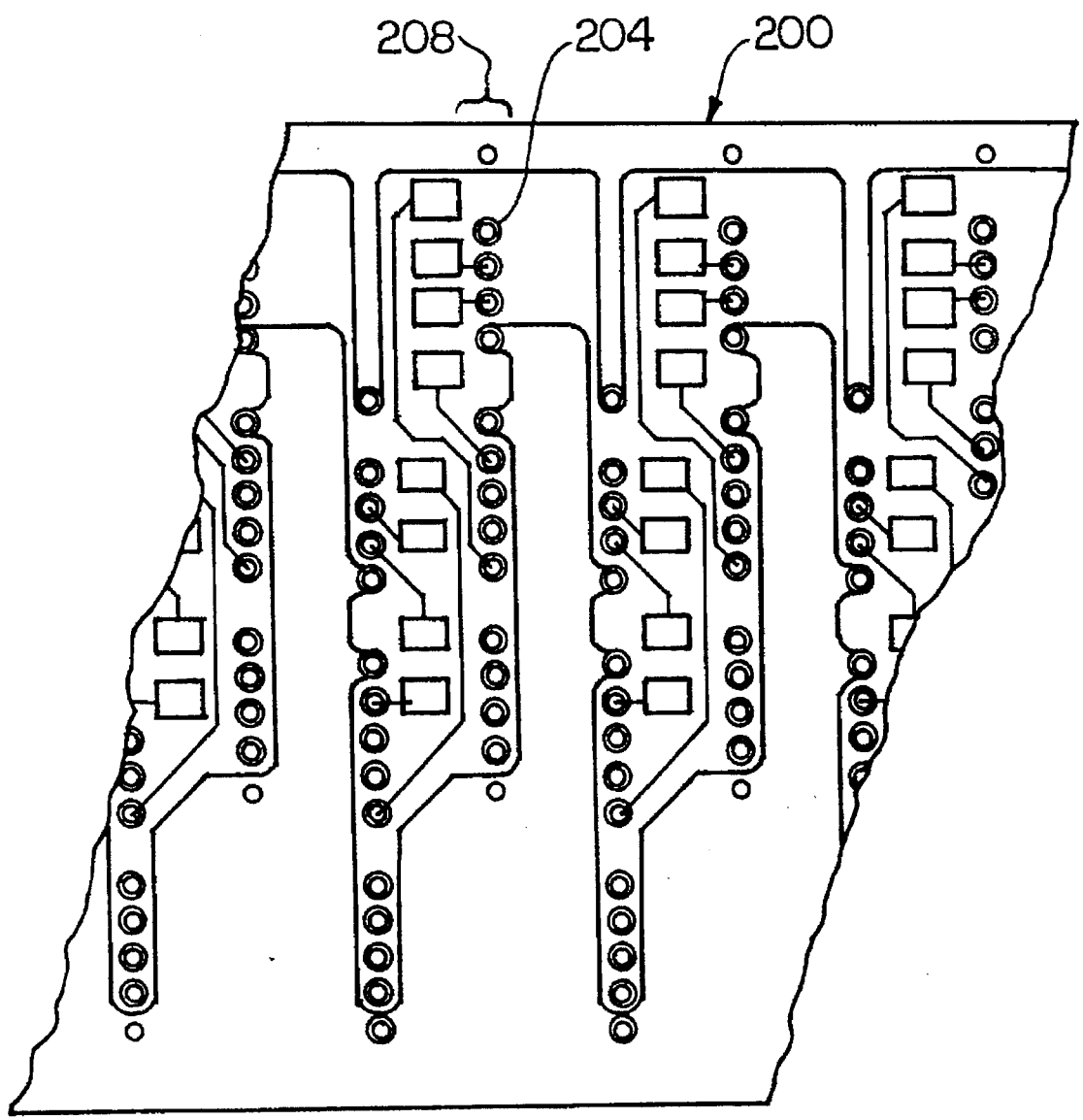
FIG. 6 is a plan view of a portion of the backplane to which the miniature telephone jack of the invention is connected.
Figure 7:
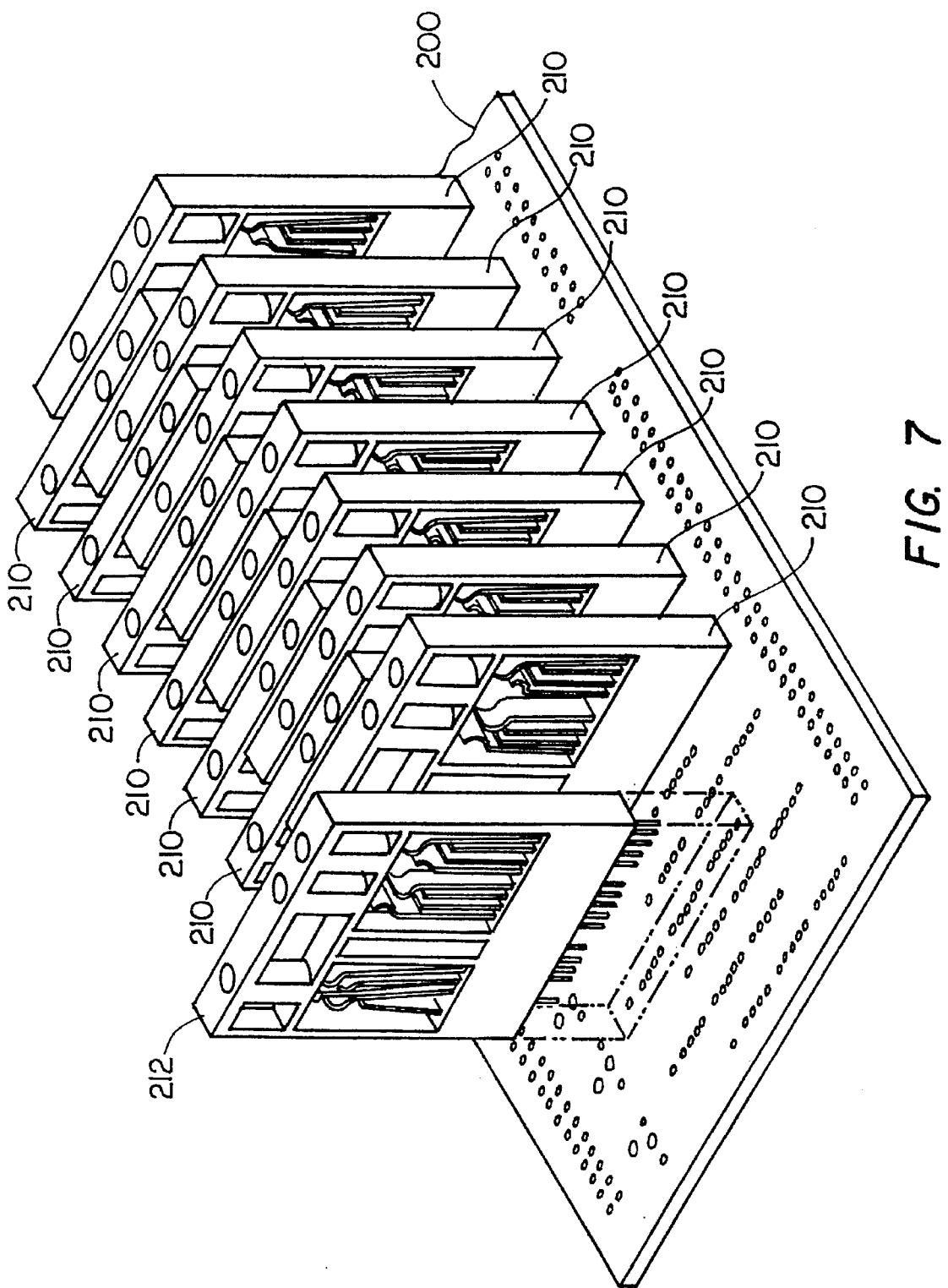
FIGS. 7 and 7a are a perspective view of miniature jacks positioned on the backplane of FIG. 6, and a plan view of the backplane of FIG. 6 depicting the miniature telephone jacks in phantom.
Figure 7A:
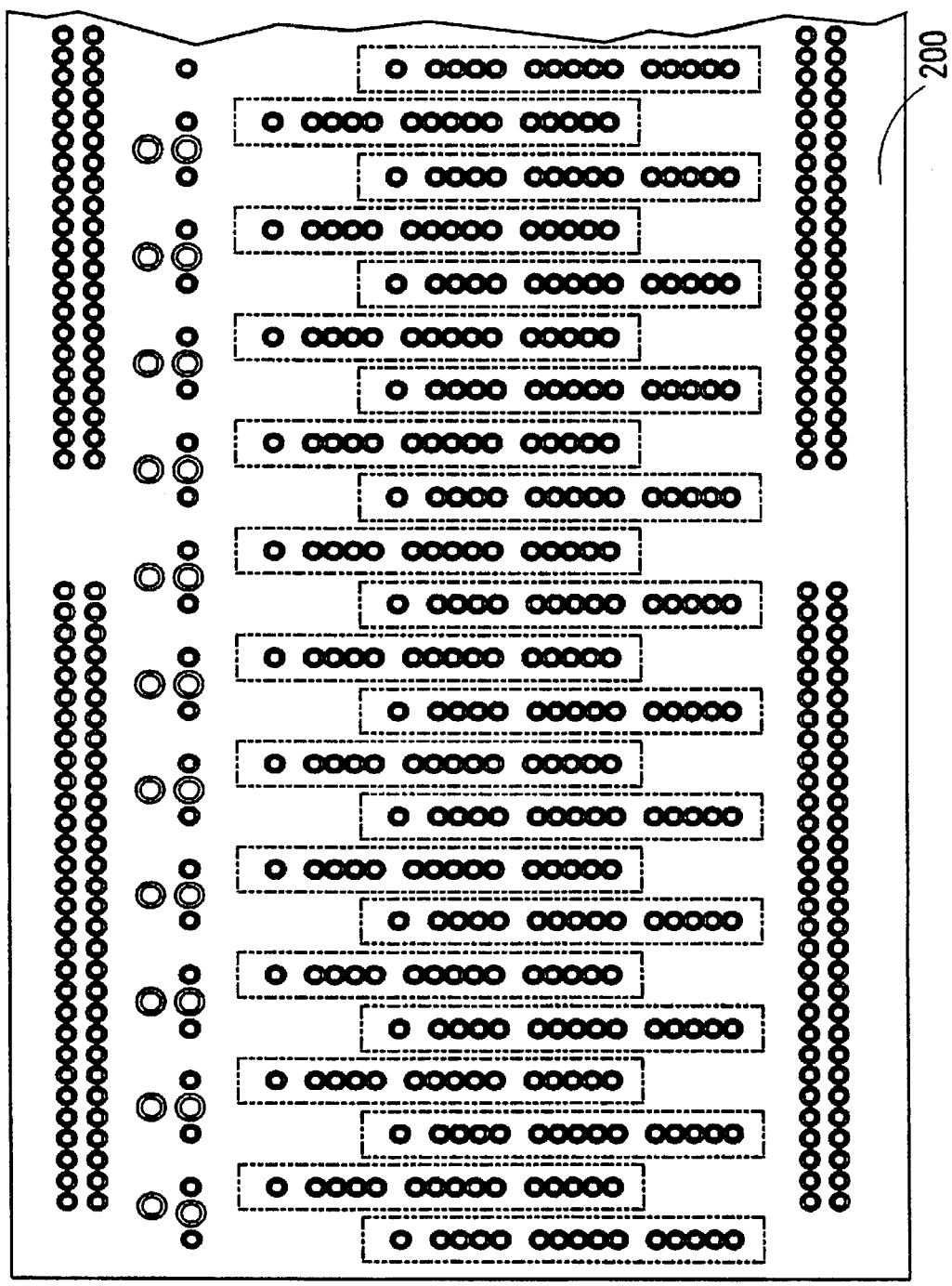

FIG. 5 is a schematic diagram of a DSX circuit in which the miniature jacks of the invention may be used. In one embodiment, the DSX circuit connections are fabricated on a printed circuit backplane 200 shown in plan view in FIG. 6. In one embodiment, each of the contacts of the miniature jack plug into and are held to the board by retainers 204 located in the backplane. In one embodiment, the printed circuit board backplane is a two layered board and the contacts of each miniature jack and the corresponding holes in the backplane are linearly arranged in a single row 208. Such an arrangement permits two layer boards with 10 mil. traces to be fabricated. FIG. 7 depicts a portion of the printed circuit board 200 with several miniature jacks 210 fully inserted and an additional miniature jack 212 about to be inserted. It should be noted that the backplane need not be a printed circuit board but could be a wire wrapped board or other backplane known in the art. FIG. 7a shows a plan view of the printed circuit board 200 with the staggered arrangement of miniature jacks shown in phantom. Note that, adjacent rows on the printed circuit board are vertically offset corresponding to the vertical offset of adjacent miniature jacks.

Figure 8:
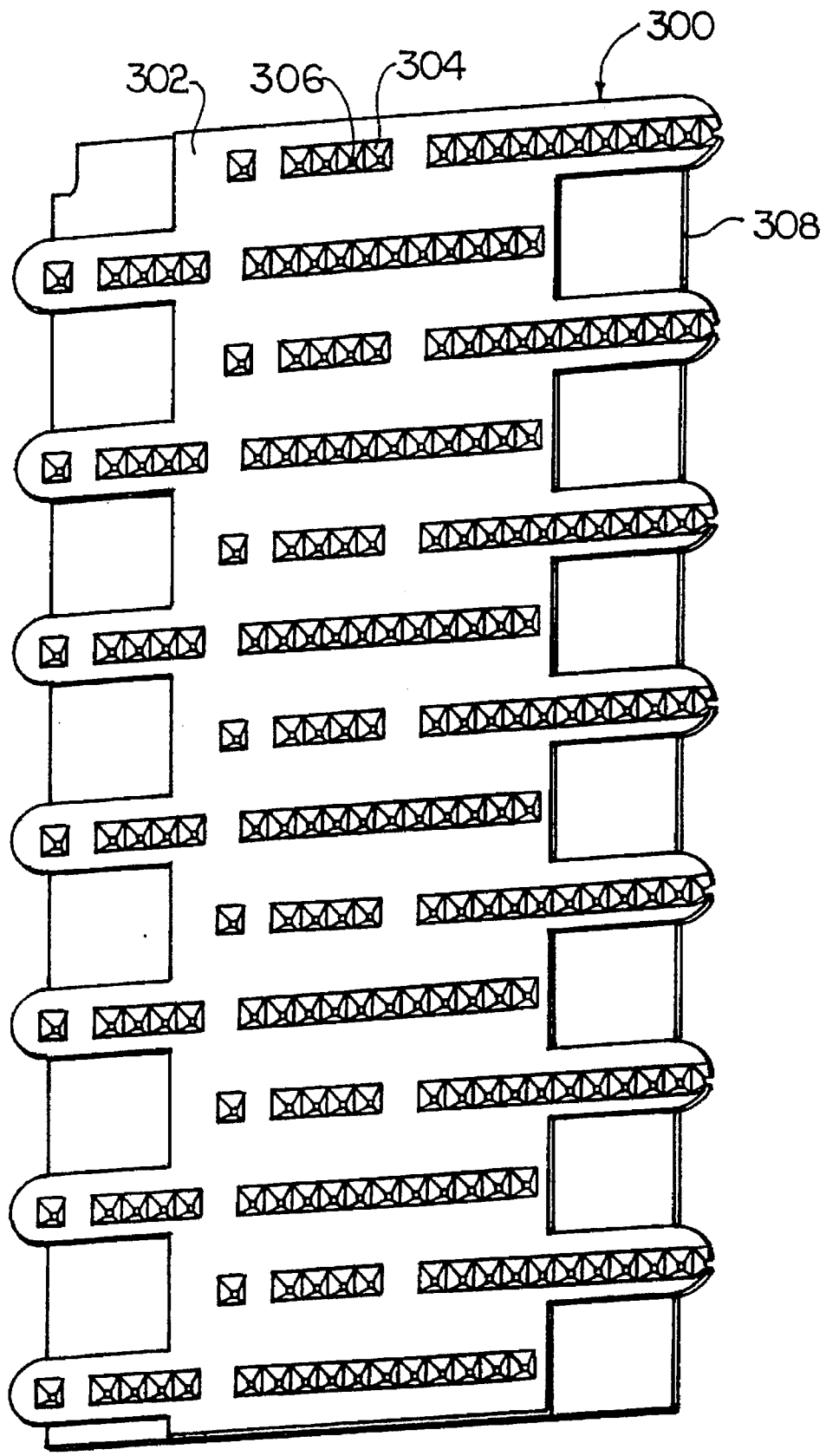
FIG. 8 is a perspective view of a funnel plate which can be employed with the backplane.

A funnel plate 300, shown in FIG. 8 can be employed in association with the backplane to facilitate pluggable insertion of the jacks into the backplane. The funnel plate includes a thin sheet of plastic or other suitable material having on one surface 302 thereof a plurality of square funnel-shaped openings 304 which taper to a rectangular opening 306 in the opposite surface 308 of the plate. The plate is mounted on the backplane, and is retained thereon such as by posts which are cooperative with openings in the backplane to align the openings 308 on the rear surface of the plate with the contact openings of the backplane. The leads of the jacks when plugged into the backplane first confront the inwardly tapered openings, the tapering serving to align any bent or misaligned terminal pins and to guide the terminal pins into the associated contact openings of the backplane.

Figure 9A:
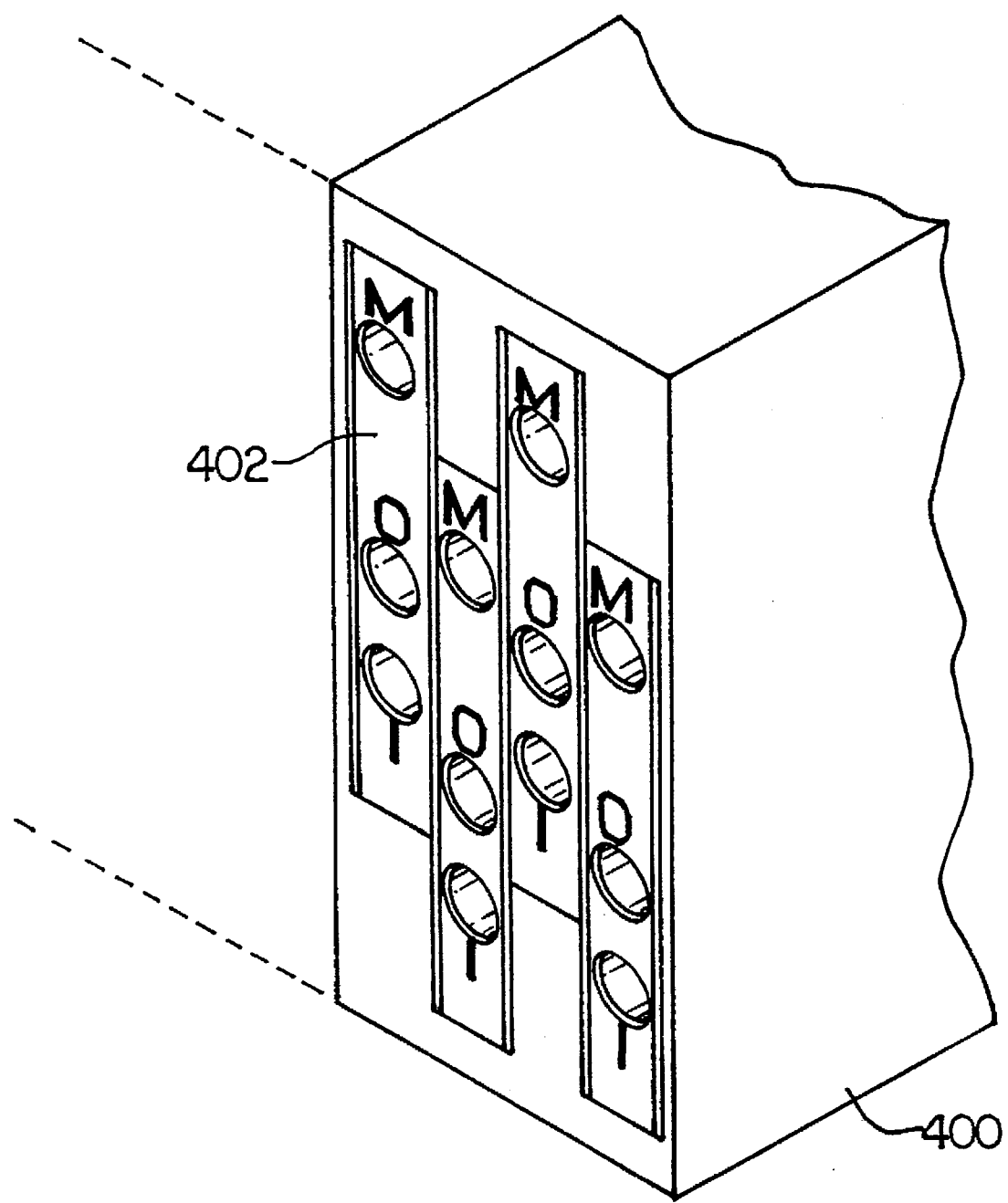
FIGS. 9a and 9b are perspective views of alternative embodiments of a jack module having adjacent staggered jacks therein.
Figure 9B:
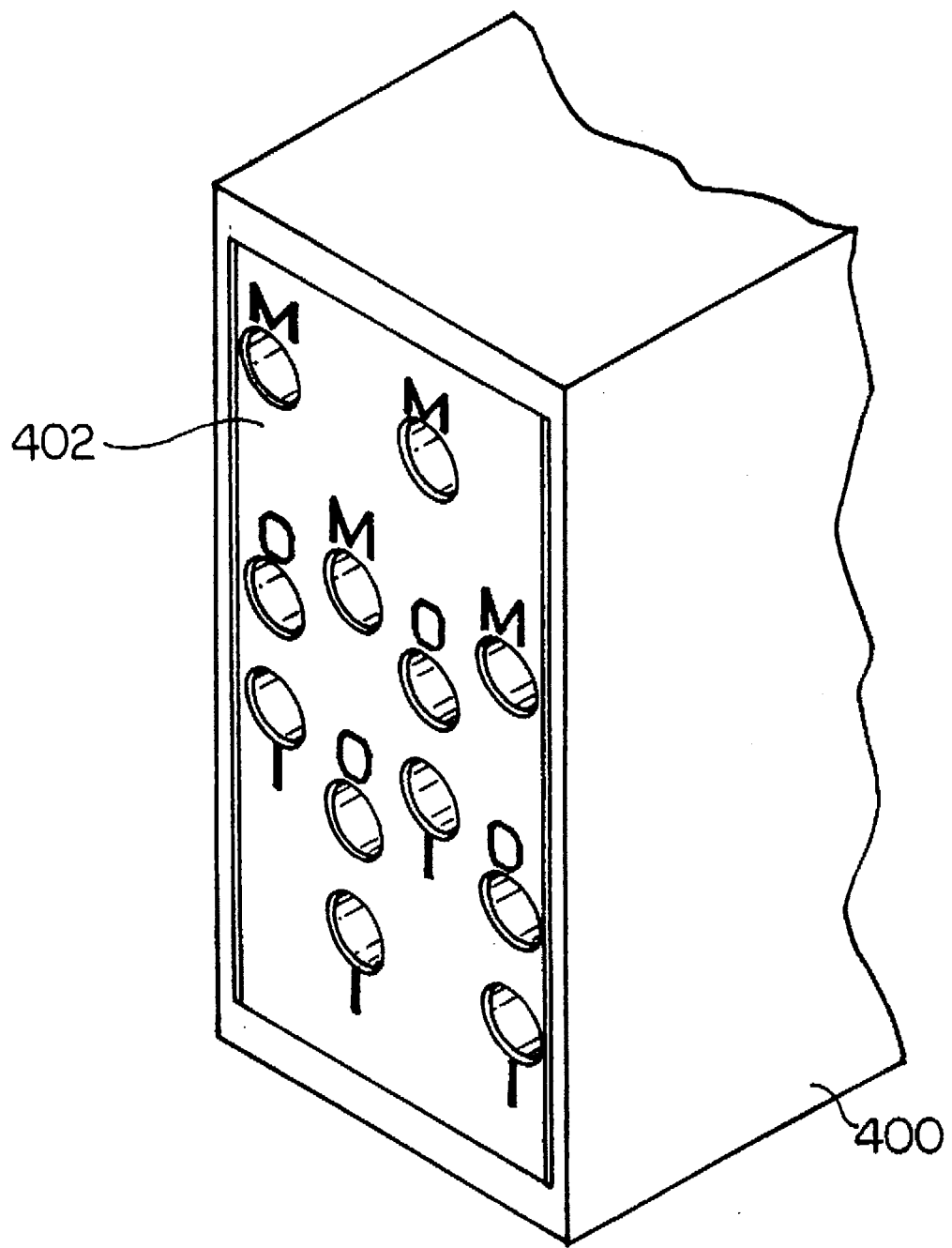

Alternative embodiments are illustrated in FIGS. 9a and 9b wherein a plurality of jacks are disposed within a jack module. The module comprises a housing 400 containing, in the illustrated embodiment, four jacks 402 which are disposed in side by side vertically offset or staggered relationship as shown. The jacks have the same offset relationship as in the embodiments described above; however, here the jacks are within a housing which itself serves as the module to be plug inserted or otherwise mounted in a suitable rack or other mounting enclosure. These modules are arranged side by side in a linear, non-staggered, relationship as shown by the dotted lines. The staggered relationship of adjacent jacks is provided by the staggered arrangement of the jacks within the modules. The jacks may be as illustrated in FIG. 2 and arranged side by side within the modular housing as in FIG. 9a, or the plurality of jacks may be unitarily provided within the modular housing, as in FIG. 9b.

Although this embodiment is described in terms of a miniature bantam telephone jack, the jack and rack of the invention may be used in other telephone and non-telephone applications and with other dimensions without the loss of generality.

Having shown the preferred embodiment, those skilled in the art will realize many variations are possible which will still be within the scope and spirit of the claimed invention. Therefore, it is the intention to limit the invention only as indicated by the scope of the claims.

What is claimed is:

1. A telephone jack assembly which reduces required separation between individual jacks comprising:
   a plurality of identical jacks each having at least one port defining a pattern, each jack in said jack assembly defining the same port pattern, said at least one port providing access to a plurality of internal contact springs; and
   a housing for holding said plurality of identical jacks in staggered vertical relationship such that port patterns defined by adjacent jacks are offset from one another, whereby separation between adjacent jacks within said housing is reduced without causing interference between plugs inserted into said jacks.

2. The jack assembly of claim 1 wherein said plugs are single plugs.

3. The jack assembly of claim 1 wherein said plugs are dual plugs.

4. The jack assembly of claim 1 wherein said jacks are plug-in jacks.

5. The jack assembly of claim 1 wherein each of said plurality of identical jacks is a bantam jack.

6. The jack assembly of claim 1 wherein said housing includes a backplane assembly and wherein each of said plurality of said jacks further comprises a plurality of electrical contacts arranged in a staggered arrangement, said plurality of electrical contacts plugging into corresponding holes in said backplane assembly.

7. The jack assembly of claim 1 wherein said adjacent jacks are vertically offset by substantially 0.5 inches.

8. The jack assembly of claim 1 wherein each said jack includes three ports and said first port is separated from said second port by substantially 0.312 inches and said third port is separated from said second port by substantially 0.657 inches as measured to the centers of said ports.

9. The jack assembly of claim 1 wherein said housing includes a backplane assembly and wherein each of said plurality of jacks further comprises a plurality of electrical contacts arranged in a single row, said plurality of electrical contacts plugging into corresponding holes in said backplane assembly.

10. The jack assembly of claim 9 further including a funnel plate disposed on a face of the backplane and operative to align the electrical contacts of said jacks when plugged into corresponding holes of the backplane assembly.

11. The jack assembly of claim 9 wherein said backplane assembly is a wirewrap backplane.

12. The jack assembly of claim 9 wherein said backplane assembly is a printed circuit backplane assembly.

13. The jack assembly of claim 12 wherein said printed circuit backplane assembly comprises a two layer board.

14. The jack assembly of claim 13 wherein said two layer board comprises 10 mil traces.

* * * * *